(12) United States Patent
Huang

(10) Patent No.: US 10,679,399 B2
(45) Date of Patent: Jun. 9, 2020

(54) ANIMATION GENERATION METHOD AND APPARATUS

(71) Applicant: Alibaba Group Holding Limited, George Town (KY)

(72) Inventor: Tong Huang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/220,293

(22) Filed: Dec. 14, 2018

(65) Prior Publication Data
US 2019/0122413 A1   Apr. 25, 2019

Related U.S. Application Data

(63) Continuation of application No. PCT/CN2017/087132, filed on Jun. 5, 2017.

(30) Foreign Application Priority Data

Jun. 17, 2016   (CN) .......................... 2016 1 0440283

(51) Int. Cl.
*G06T 13/80*   (2011.01)
*G06F 40/12*   (2020.01)
*G06T 13/00*   (2011.01)
*G06F 40/14*   (2020.01)

(52) U.S. Cl.
CPC .............. *G06T 13/80* (2013.01); *G06F 40/12* (2020.01); *G06T 13/00* (2013.01); *G06F 40/14* (2020.01); *G06T 2210/44* (2013.01)

(58) Field of Classification Search
None
See application file for complete search history.

(56) References Cited

U.S. PATENT DOCUMENTS

| 8,134,558 B1 | 3/2012 | Mayhew |
| 2006/0077206 A1 | 4/2006 | Jaeger |
| 2006/0103655 A1 | 5/2006 | Nelson |

(Continued)

FOREIGN PATENT DOCUMENTS

| CN | 102449664 | 5/2012 |
| CN | 103150746 | 6/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Robert Bader
(74) *Attorney, Agent, or Firm* — Fish & Richardson P.C.

(57) ABSTRACT

An animation generation instruction identifying key frames to use for generating an animation is received. A plurality of tweens corresponding to the animation are obtained, where each tween includes tween objects between a start key frame and an end key frame. One or more timelines are generated when a quantity of tweens is greater than or equal to two, where each timeline corresponds to one or more tweens, and where a quantity of timelines is less than the quantity of tweens. The animation is generated using the plurality of tweens based on the one or more timelines.

17 Claims, 6 Drawing Sheets

(56) References Cited

U.S. PATENT DOCUMENTS

| | | | |
|---|---|---|---|
| 2011/0096076 A1* | 4/2011 | Kwiatkowski | G06T 13/00 |
| | | | 345/473 |
| 2013/0038607 A1 | 2/2013 | Nakamura | |
| 2013/0079911 A1 | 3/2013 | Dong et al. | |
| 2014/0300610 A1 | 10/2014 | Mayhew | |

FOREIGN PATENT DOCUMENTS

| | | |
|---|---|---|
| CN | 104142820 | 11/2014 |
| JP | 2006146924 | 6/2006 |

OTHER PUBLICATIONS

Nakamoto, "Bitcoin: A Peer-to-Peer Electronic Cash System," www.bitcoin.org, 2005, 9 pages.
European Extended Search Report in European Application No. 17812585.2, dated Jun. 5, 2019, 8 pages.
Lu et al., "Timeline Editing of Objects in Video," IEEE Transactions on Visualization and Computer Graphics, 2013, 19(7):1218-1227.
Wang, "Explore Flash CS6 'Create a Tween'," Software Engineer, 2014, 17(11), 2 pages (with English Abstract).
Xing, "Animation Based on Flash 8.0—Transform Text," Microcomputer Applications, 2014, 30(4):62-64 (with English Abstract).
International Preliminary Report on Patentability in International Application No. PCT/CN2017/087132 dated Dec. 18, 2018; 7 pages.
International Search Report by the International Searching Authority issued in International Application No. PCT/CN2017/087132 dated Aug. 30, 2017; 9 pages.

* cited by examiner

ANIMATION GENERATION METHOD AND APPARATUS

CROSS-REFERENCE TO RELATED APPLICATIONS

This application is a continuation of PCT Application No. PCT/CN2017/087132, filed on Jun. 5, 2017, which claims priority to Chinese Patent Application No. 201610440283.0, filed on Jun. 17, 2016, and each application is hereby incorporated by reference in its entirety.

TECHNICAL FIELD

The present application relates to the field of image processing technologies, and in particular, to an animation generation method and apparatus.

BACKGROUND

A canvas element is a hypertext markup language (HTML) element, and the canvas element does not have a drawing function itself, but provides an application programming interface (API) to support drawing operations of a script client.

In related technologies, timeline-based tween technologies are usually used to generate an animation. However, in such an implementation, a plurality of canvas elements can be generated during the generation of a complex animation with a plurality of objects. A client draws a whole canvas for each canvas element when playing the animation. Consequently, relatively high performance overheads can be produced to the device.

SUMMARY

In view of this, the present application provides an animation generation method and apparatus, to alleviate a problem that relatively high overheads are caused when a complex animation is generated by using related technologies.

The present application is implemented by using the following technical solutions.

An animation generation method is provided, and the method includes: obtaining a quantity of tweens after receiving an animation generation instruction; generating one or more timelines when the quantity of tweens is greater than or equal to 2, where each timeline corresponds to one or more tweens, and a quantity of timelines is less than the quantity of tweens; and generating an animation for the corresponding tween based on the timeline.

An animation generation apparatus is provided, and the apparatus includes a quantity acquisition unit, configured to obtain a quantity of tweens after an animation generation instruction is received; a timeline creation unit, configured to generate one or more timelines when the quantity of tweens is greater than or equal to 2, where each timeline corresponds to one or more tweens, and a quantity of timelines is less than the quantity of tweens; and an animation generation unit, configured to generate an animation for the corresponding tween based on the timeline.

It can be seen from the previous descriptions that, in the present application, during generation of the animation, the timelines less than the tweens are generated. When playing the animation, user equipment does not need to draw canvases of the same quantity as the tweens, so that many unnecessary redrawing operations are reduced, and performance overheads of the user equipment caused when the user equipment plays a complex animation are reduced.

DESCRIPTION OF IMPLEMENTATIONS

Example implementations are described in detail here, and examples of the example implementations are presented in the accompanying drawings. When the following description relates to the accompanying drawings, unless specified otherwise, same numbers in different accompanying drawings represent same or similar elements. Implementations described in the following example implementations do not represent all implementations consistent with the present application. Instead, they are only examples of apparatuses and methods consistent with some aspects of the present application that are described in detail in the appended claims.

The terms used in the present application are merely for illustrating specific implementations, and are not intended to limit the present application. The terms "a" and "the" of singular forms used in the present application and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present application to describe various types of information, the information is not limited to the terms. These terms are only used to differentiate information of a same type. For example, without departing from the scope of the present application, first information can also be referred to as second information, and similarly, the second information can be referred to as the first information. Depending on the context, for example, the word "if" used here can be explained as "while", "when", or "in response to determining".

A tween, also referred to as a tween animation, is a gradient animation generated between two key frames (a start key frame and an end key frame). When generating a complex animation with a plurality of objects, an animation generation device usually generates a corresponding timeline for each tween based on tweens that are set by a producer. When user equipment plays the animation, a canvas element is generated based on each timeline, and the user equipment draws a corresponding whole canvas for each canvas element. Consequently, many unnecessary redrawing operations are caused, and relatively high performance overheads are brought to the user equipment.

To alleviate the previous problem, the present application provides an animation generation method, to effectively reduce performance overheads of a device when the device plays an animation.

Figure 1:
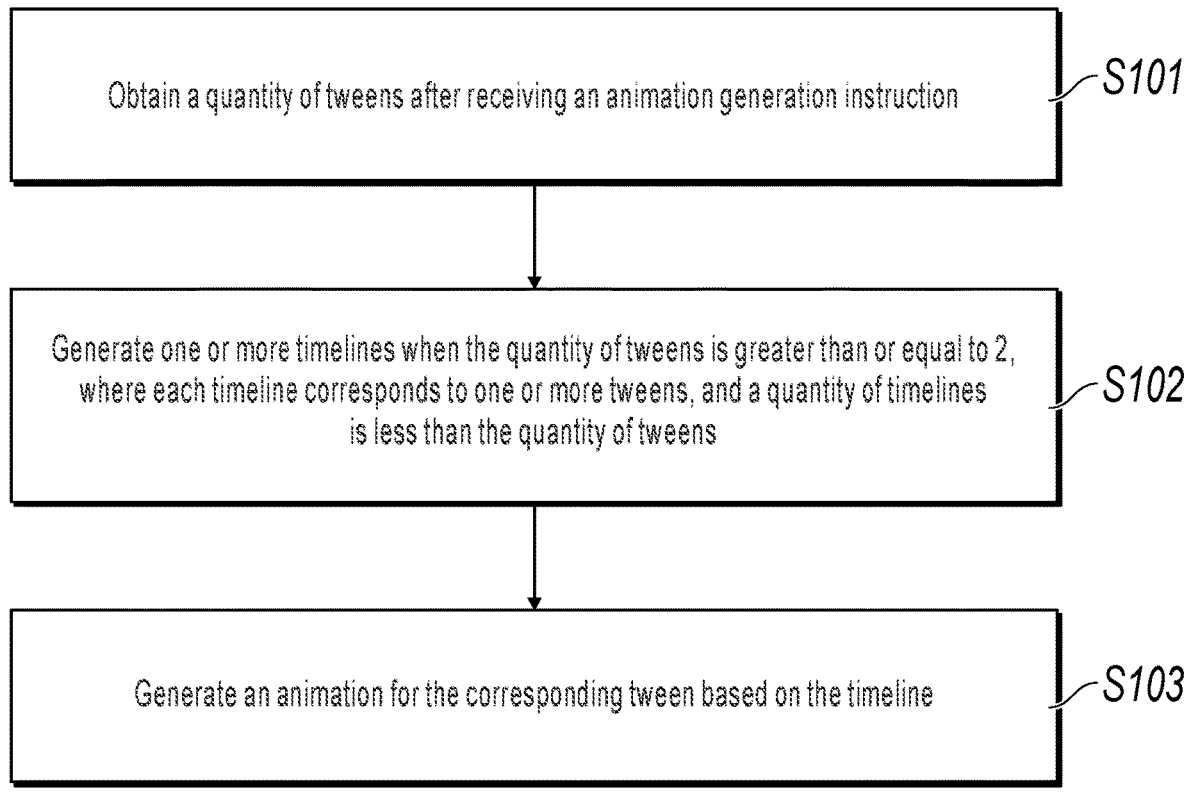
FIG. 1 is a schematic flowchart illustrating an animation generation method, according to an example implementation of the present application.

FIG. 1 is a schematic flowchart illustrating an animation generation method, according to an example implementation of the present application.

Referring to FIG. 1, the animation generation method can be applied to an animation generation device. The animation generation device can include an intelligent end-user device such as a smartphone, a tablet computer, a personal digital assistant (PDA), and a PC. The animation generation method can be understood as processing logic performed by a client that is loaded in the animation device and that has an animation generation function, and the animation generation method includes the following steps.

Step 101: Obtain a quantity of tweens after receiving an animation generation instruction.

In the present implementation, to generate an animation, a producer can insert a selected picture into the client as a key frame, or a user can draw a key frame by using a drawing function provided by the client. Implementations are not limited in the present application. The key frame is equivalent to an original image in a two-dimensional animation, and is a frame corresponding to a key action in movement or change of a role or an object.

In the present implementation, the producer can insert the key frame and set a tween based on a key frame timeline provided by the client. Referring to a key frame timeline shown in FIG. 2, scales on the key frame timeline are used to indicate frame numbers of key frames. For example, scale 1 indicates a key frame with frame number 1, and scale 5 indicates a key frame with frame number 5. The producer can insert a key frame into the key frame timeline, for example, the producer can insert, at scale 1, the key frame with frame number 1, and insert, at scale 15, a key frame with frame number 15. After inserting the key frame, the user can select two key frames used for a tween. Optionally, the user can select a frame number in the key frame timeline by using a mouse, and key frames on the two sides of the frame number are respectively a start key frame and an end key frame of the present tween. The client can generate the tween based on the start key frame and the end key frame.

Figure 2:
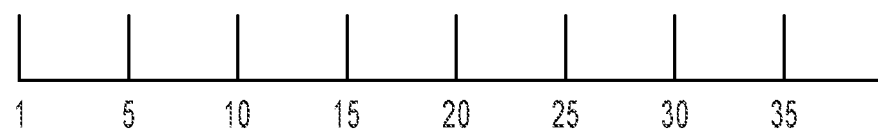
FIG. 2 is a schematic diagram illustrating a key frame timeline, according to an example implementation of the present application.

For example, still referring to the key frame timeline shown in FIG. 2, assume that the producer inserts three key frames, and frame numbers of the three key frames are respectively 1, 10, and 15. When the producer selects frame number 5, the client can determine that a start key frame of the present tween is a key frame with frame number 1, and an end key frame is a key frame with frame number 10.

In the present implementation, the producer can set a plurality of tweens based on needs and based on the key frame timeline provided by the client. For example, the producer can tap the key frame timeline twice to set two tweens. Referring to tween information shown in Table 1, a frame number of a tween's start key frame is 5, a frame number of the tween's end key frame is 8, a frame number of the other tween's start key frame is 12, and a frame number of the other tween's end key frame is 18.

TABLE 1

|  | Frame number of a start key frame | Frame number of an end key frame |
| --- | --- | --- |
| Tween 1 | 5 | 8 |
| Tween 2 | 12 | 18 |

In the present implementation, the animation generation instruction is usually triggered by the user after the user sets a tween, and the client can obtain the quantity of tweens after receiving the animation generation instruction.

Step 102: Generate one or more timelines when the quantity of tweens is greater than or equal to 2, where each timeline corresponds to one or more tweens, and a quantity of timelines is less than the quantity of tweens.

Based on step 101, after obtaining the quantity of tweens, the client can first determine whether the quantity of tweens is greater than or equal to 2. When the quantity of tweens is 1, the client can generate an animation with reference to an implementation solution in related technologies. When the quantity of tweens is greater than or equal to 2, the client can generate timelines less than the tweens, and each timeline corresponds to one or more tweens.

In the present implementation, the quantity of generated timelines can be set by a developer. In an example, when the quantity of tweens is greater than or equal to 2, one timeline can be generated, and the timeline corresponds to all the tweens. In another example, when the quantity of tweens is greater than or equal to 2, the quantity of the timelines generated can be a half of the quantity of tweens. For example, assume that the quantity of tweens is 8, four timelines can be generated, and each timeline corresponds to two tweens. Alternatively, assume that the quantity of tweens is 9, four timelines can be generated, where three timelines each correspond to two tweens, and the remaining timeline corresponds to three tweens. Certainly, five timelines can be generated, where four timelines each correspond to two tweens, and the remaining timeline corresponds to one tween. When a plurality of timelines are generated, a tween corresponding to each timeline can be randomly determined or can be determined based on a specific rule, for example, tweens are sequentially allocated to the timelines in ascending order of frame numbers of the tweens' start frames.

Step 103: Generate an animation for the corresponding tween based on the timeline.

Based on step 102, after the timeline is generated, the animation can be generated for the corresponding tween based on each timeline.

In the present implementation, the generated animation is essentially Javascript code, and a browser of user equipment can run the Javascript code to generate an animation for the user to view. In the present step, because the quantity of generated timelines is less than the quantity of tweens that are set by the producer, a quantity of timelines in the generated Javascript code is also less than the quantity of tweens. When running the Javascript code, the user equipment generates a canvas and draws based on the quantity of timelines in the Javascript code, thereby reducing many unnecessary redraws.

It can be seen from the previous descriptions that, in the present application, during generation of the animation, the timelines less than the tweens are generated. When playing the animation, the user equipment does not need to draw canvases of the same quantity as the tweens, so that many unnecessary redrawing operations are reduced, and performance overheads of the user equipment caused when the user equipment plays a complex animation are reduced.

Figure 3:
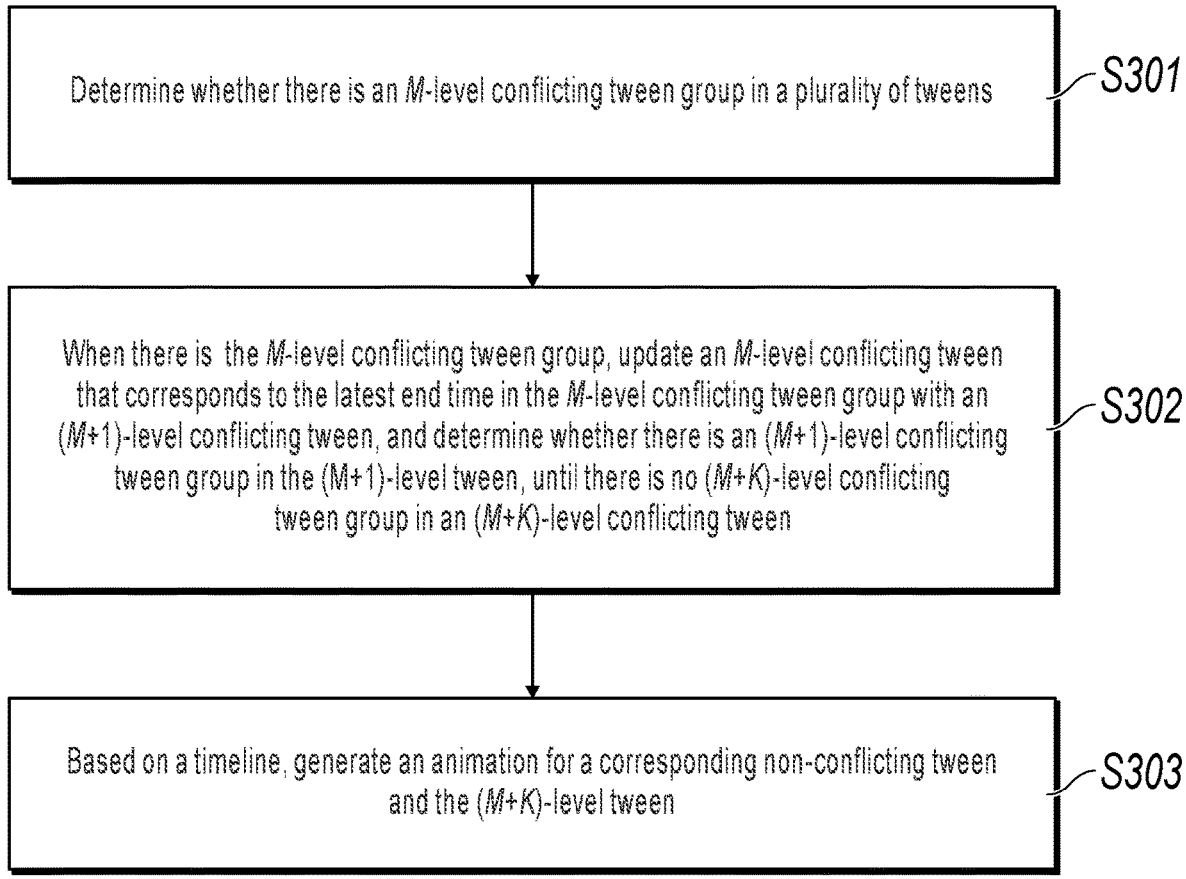
FIG. 3 is a schematic flowchart illustrating a method for generating an animation for a corresponding tween based on a timeline, according to an example implementation of the present application.

In an example, when a certain timeline is corresponding to a plurality of tweens, referring to FIG. 3, and the generating an animation for the corresponding tween based on the timeline can include the following steps.

Step 301: Determine whether there is an M-level conflicting tween group in the plurality of tweens, where M is a natural number, and an initial value is a default count initial value. If yes, step 302 can be performed.

In the present implementation, when a certain timeline corresponds to a plurality of tweens, a tween object of each tween can be first obtained, and a quantity of corresponding tweens is counted based on each tween object. When a quantity of tweens corresponding to a certain tween object is greater than or equal to 2, in other words, two or more tweens in a plurality of tweens corresponding to the timeline have the same tween object, determine whether a tween time of any one of the two or more tweens conflicts with a tween time of another tween can be determined. If the tween time of the any tween conflicts with the tween time of the another tween, it can be determined that there is at least one M-level conflicting tween group in the plurality of tweens corresponding to the timeline, and the M-level conflicting tween group includes said any tween and the another tween.

TABLE 2

| Timeline | Tween | Tween object | Frame number of a start key frame | Frame number of an end key frame |
|---|---|---|---|---|
| Timeline A | Tween 1 | Element A | 5 | 8 |
|  | Tween 2 | Element A | 6 | 11 |
|  | Tween 3 | Element B | 2 | 7 |
|  | Tween 4 | Element A | 12 | 15 |
|  | Tween 5 | Element B | 8 | 10 |

For example, referring to the example in Table 2, assume that an initial value of M is 1, and timeline A corresponds to five tweens. In the present step, determine whether there is a level-1 conflicting tween group in the five tweens. A tween object of each tween can be first obtained, and then a quantity of tweens corresponding to each tween object can be counted. For example, tween object element A corresponds to three tweens, and tween object element B corresponds to two tweens.

In the present implementation, it is determined whether a tween time of any one of the three tweens corresponding to tween object element A conflicts with a tween time of another tween. Optionally, for tween 1, whether a tween time of tween 1 conflicts with a tween time of tween 2 can be determined, and whether the tween time of tween 1 conflicts with a tween time of tween 4 can be determined. The tween time can be represented by using an interval between a frame number of a tween's start key frame and a frame number of the tween's end key frame. For example, the tween time of tween 1 is [5, 8], and the tween time of tween 2 is [6, 11]. When determining whether the tween time of tween 1 conflicts with the tween time of tween 2, whether there is an intersection between the tween time of tween 1 and the tween time of tween 2 can be determined. There is an intersection between [5, 8] and [6, 11]. Then, it can be determined that the tween time of tween 1 conflicts with the tween time of tween 2 and that there is a level-1 conflicting tween group in tweens corresponding to tween object element A. The level-1 conflicting tween group includes tween 1 and tween 2. For ease of description, a tween in the level-1 conflicting tween group can be referred to as a level-1 conflicting tween.

In the present implementation, with reference to the previous solution, it can be further determined that the tween time of tween 1 does not conflict with the tween time of tween 4 and that the tween time of tween 2 does not conflict with the tween time of tween 4. Then it can be determined that there is one level-1 conflicting tween group in the three tweens corresponding to tween object element A, and the level-1 conflicting tween group includes level-1 conflicting tween 1 and level-1 conflicting tween 2.

In addition, for the two tweens corresponding to tween object element B: tween 3 and tween 5, it can be determined that a tween time of tween 3 does not conflict with a tween time of tween 5 and that there is no level-1 conflicting tween group in the two tweens corresponding to tween object element B.

In the present implementation, a tween that is not included in the level-1 conflicting tween group is a non-conflicting tween, for example, tween 3, tween 4, and tween 5 are non-conflicting tweens corresponding to timeline A.

Step 302: Update an M-level conflicting tween that corresponds to the latest end time in the M-level conflicting tween group with an (M+1)-level conflicting tween, and determine whether there is an (M+1)-level conflicting tween group in the (M+1)-level conflicting tween, until there is no (M+K)-level conflicting tween group in an (M+K)-level conflicting tween.

Based on a determining result of step 301, when there is the M-level conflicting tween group in the plurality of tweens corresponding to the timeline, an M-level conflicting tween that corresponds to the latest end time in each M-level conflicting tween group can be updated with an (M+1)-level conflicting tween. This is because a frame image that corresponds to the latest end key frame usually can best indicate what a producer wants to achieve. Therefore, when there is a conflicting tween group for the same tween object, a tween that corresponds to the latest end key frame is used. An M-level conflicting tween having the largest frame number of a tween end key frame in the M-level conflicting tween group can be updated with the (M+1)-level conflicting tween.

The tween information shown in Table 2 is still used as an example. For the level-1 conflicting tween group, a level-1 conflicting tween having the largest frame number of a tween end key frame in the level-1 conflicting tween group can be updated with a level-2 conflicting tween. A frame number of an end key frame of tween 1 is 8, and a frame number of an end key frame of tween 2 is 11. Then, tween 2 can be updated with the level-2 conflicting tween. As such, timeline A corresponds to one level-2 conflicting tween: tween 2, and includes no level-2 conflicting tween group. Therefore, step 303 can be further performed.

Step 303: Based on the timeline, generate an animation for a corresponding non-conflicting tween and the (M+K)-level tween.

In the present implementation, when there is no (M+K)-level conflicting tween group in the (M+K)-level conflicting tween, the animation can be generated for the corresponding non-conflicting tween and the (M+K)-level tween based on the timeline. Table 2 is still used as an example. In the present step, an animation can be generated for tween 2, tween 3, tween 4, and tween 5 based on timeline A.

It can be seen from the previous descriptions that, based on the technical solution provided in the present application, when a timeline corresponds to a plurality of tweens, an animation can be generated for a tween that corresponds to the latest end time in conflicting tweens with the same tween object and conflicting tween time, so as to effectively avoid generating conflicting animations for the same tween object, and improve user experience.

In another example in the present application, based on the tween information shown in Table 2, assume that timeline A further corresponds to tween 6, a tween object of tween 6 is element A, a frame number of a start key frame is 10, and a frame number of an end key frame is 12, a tween time of tween 6 is [10, 12]. In step 301, it can be determined that there are two level-1 conflicting tween groups in four tweens corresponding to tween object element A: tween 1, tween 2, tween 4, and tween 6. Level-1 conflicting tween group 1 includes tween 1 and tween 2, and level-1 conflicting tween group 2 includes tween 2 and tween 6.

In step 302, tween 2 that corresponds to the latest end time in level-1 conflicting tween group 1 can be updated with a level-2 conflicting tween, and tween 6 that corresponds to the latest end time in level-1 conflicting tween group 2 can be updated with a level-2 conflicting tween. Then, it can be determined, with reference to an implementation method in step 301, whether there is still a conflicting tween group (which can be referred to as a level-2 conflicting tween group) in tween 2 and tween 6. Because the tween time of tween 2 is [6, 11], and there is an intersection between the tween time [6, 11] of tween 2 and the tween time [10, 12] of tween 6, it can be determined that there is a level-2 conflicting tween group, and the level-2 conflicting tween group includes tween 2 and tween 6. As tween 6 corresponds to the latest end time, tween 6 can be updated with a level-3 conflicting tween. As such, there is no level-3 conflicting tween group in the four tweens corresponding to tween object element A, and an animation can continue to be generated. In step 303, an animation can be generated for tween 3, tween 4, tween 5, and tween 6 based on timeline A. Details are omitted in the present application.

Corresponding to the implementation of the animation generation method, the present application further provides an implementation of an animation generation apparatus.

Figure 4:
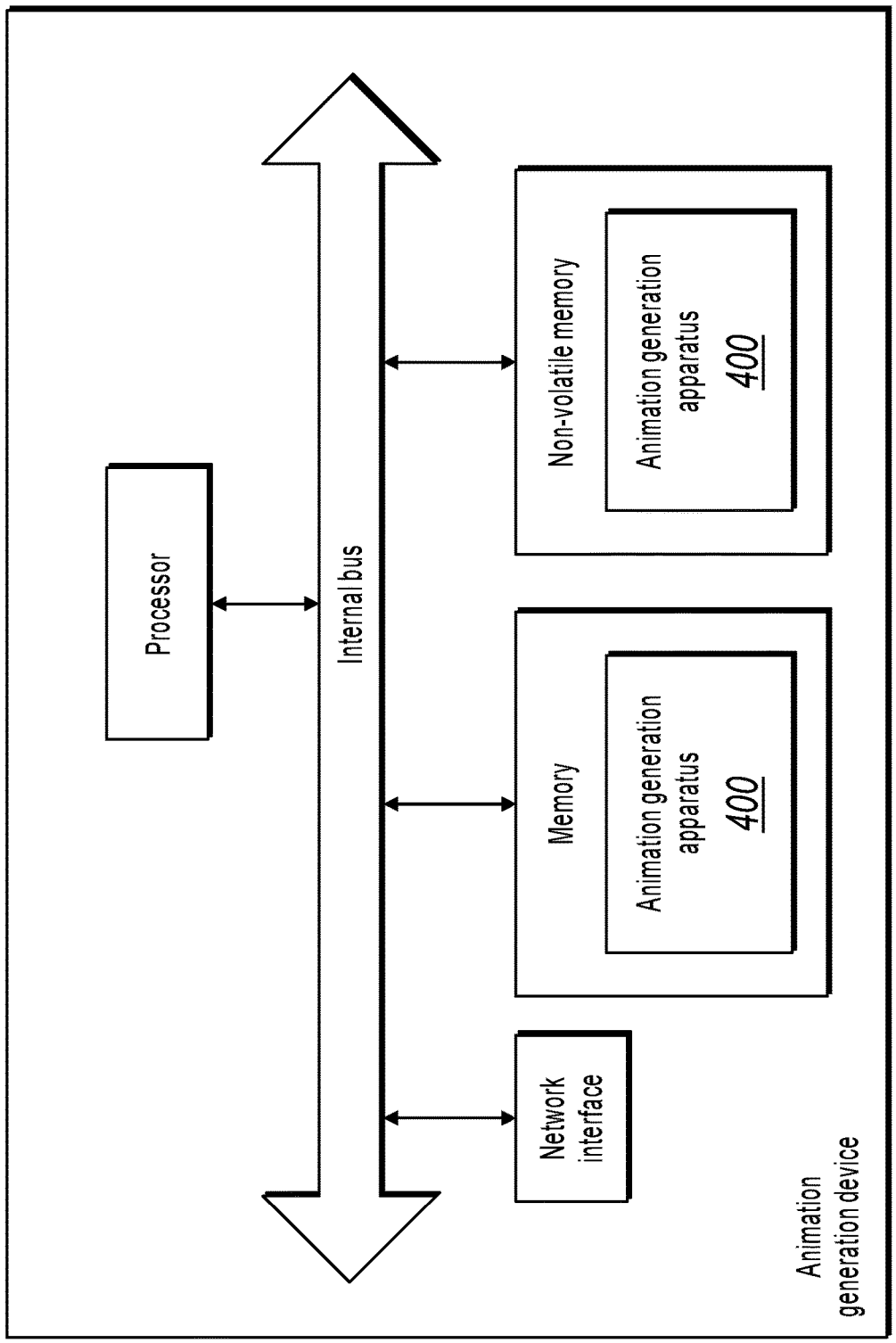
FIG. 4 is a schematic structural diagram illustrating an animation generation device that an animation generation apparatus is applied to, according to an example implementation of the present application.

The implementation of the animation generation apparatus in the present application can be applied to an animation generation device. The apparatus implementation can be implemented by software, hardware, or a combination of hardware and software. Software implementation is used as an example. As a logical device, the apparatus is formed by reading a corresponding computer program instruction in a non-volatile memory to a memory by a processor of the animation generation device in which the apparatus is located. From the perspective of hardware, as shown in FIG. 4, FIG. 4 is a structural diagram illustrating hardware of an animation generation device in which an animation generation apparatus in the present application is located. In addition to a processor, a memory, a network interface, and a non-volatile memory shown in FIG. 4, the animation generation device in which the apparatus in the present implementation is located can usually include other hardware based on actual functions of the animation generation device. Details are omitted here for simplicity.

Figure 5:
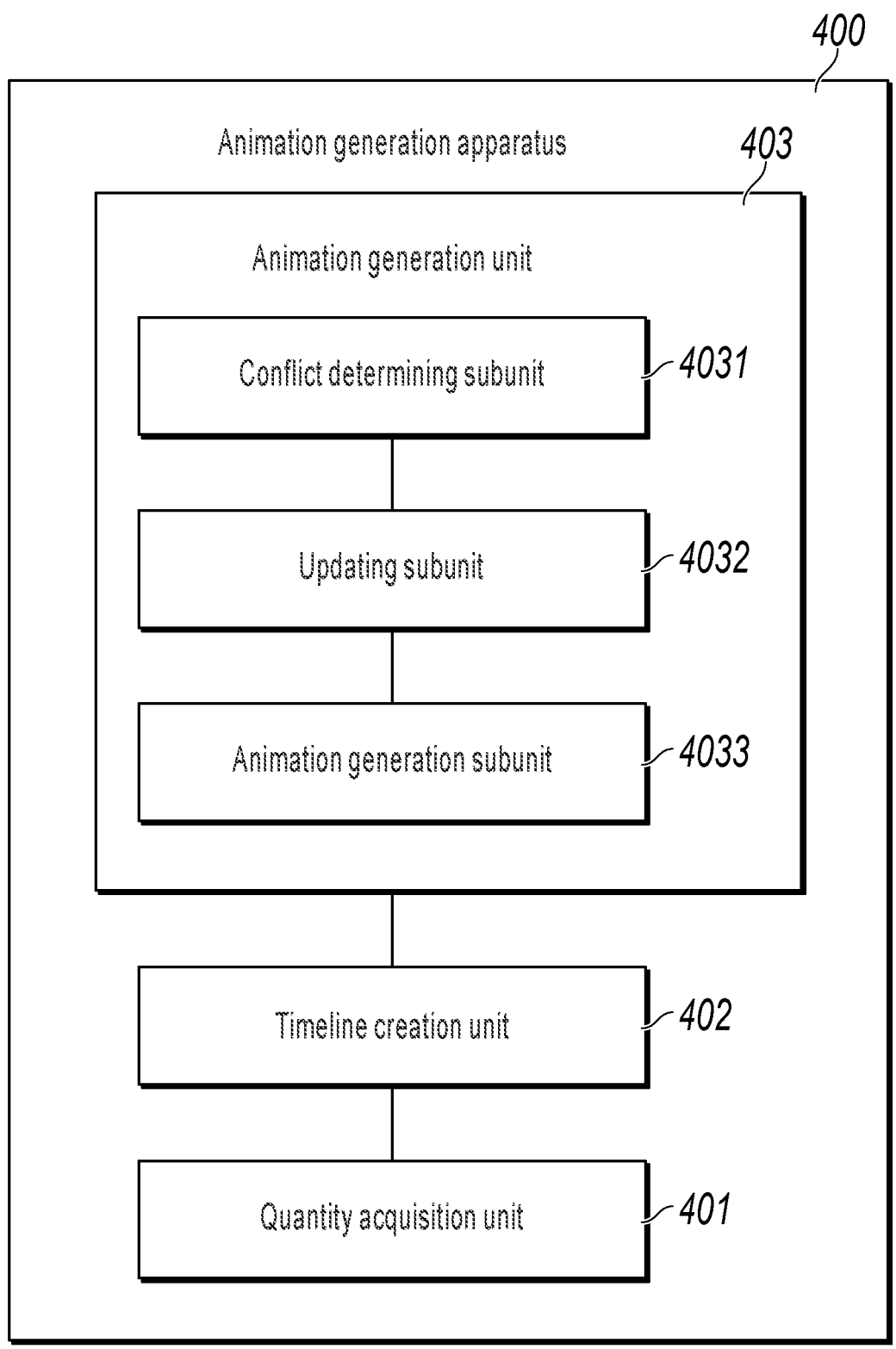
FIG. 5 is a structural block diagram illustrating an animation generation apparatus, according to an example implementation of the present application.

FIG. 5 is a structural block diagram illustrating an animation generation apparatus, according to an example implementation of the present application.

Referring to FIG. 5, the animation generation apparatus 400 can be applied to the animation generation device shown in FIG. 4, and includes a quantity acquisition unit 401, a timeline creation unit 402, and an animation generation unit 403. The animation generation unit 403 can further include a conflict determining subunit 4031, an updating subunit 4032, and an animation generation subunit 4033.

The quantity acquisition unit 401 is configured to obtain a quantity of tweens after an animation generation instruction is received.

The timeline creation unit 402 is configured to generate one or more timelines when the quantity of tweens is greater than or equal to 2. Each timeline corresponds to one or more tweens, and a quantity of timelines is less than the quantity of tweens.

The animation generation unit 403 is configured to generate an animation for the corresponding tween based on the timeline.

The conflict determining subunit 4031 is configured to determine whether there is an M-level conflicting tween group in the plurality of tweens when the timeline corresponds to a plurality of tweens. M-level conflicting tweens in the M-level conflicting tween group have the same tween object and conflicting tween time, M is a natural number, and an initial value is a default count initial value.

The updating unit 4032 is configured to update an M-level conflicting tween that corresponds to the latest end time in the M-level conflicting tween group with an (M+1)-level conflicting tween, and determine whether there is an (M+1)-level conflicting tween group in the (M+1)-level tween, until there is no (M+K)-level conflicting tween group in an (M+K)-level conflicting tween when there is the M-level conflicting tween group. K is a natural number greater than or equal to 0.

The animation generation subunit 4033 is configured to generate an animation for a corresponding non-conflicting tween and the (M+K)-level tween based on the timeline.

Optionally, the conflict determining subunit 4031 is configured to obtain a tween object of each tween; when two or more tweens have the same tween object, determine whether a tween time of any one of the two or more tweens conflicts with a tween time of another tween; and if the tween time of the any tween conflicts with the tween time of the another tween, determine that there is at least one M-level conflicting tween group in the plurality of tweens. The M-level conflicting tween group includes the any tween and the another tween.

Optionally, the conflict determining subunit 4031 determines whether there is an intersection between a tween time between a start key frame and an end key frame of the any tween and a tween time between a start key frame and an end key frame of the another tween; and if there is an intersection, determines that the tween time of the any tween conflicts with the tween time of the another tween.

Optionally, the updating subunit 4032 updates an M-level conflicting tween having the largest frame number of a tween end key frame in the M-level conflicting tween group with the (M+1)-level conflicting tween.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, and may be located in one position, or may be distributed on a plurality of network units. Some or all of the modules or units can be selected based on actual needs to achieve the objectives of the solutions in the present application. A person of ordinary skill in the art can understand and implement the implementations of the present application without creative efforts.

The previous descriptions are merely example implementations of the present application, but are not intended to limit the present application. Any modification, equivalent replacement, or improvement made without departing from the spirit and principle of the present application shall fall within the protection scope of the present application.

Figure 6:
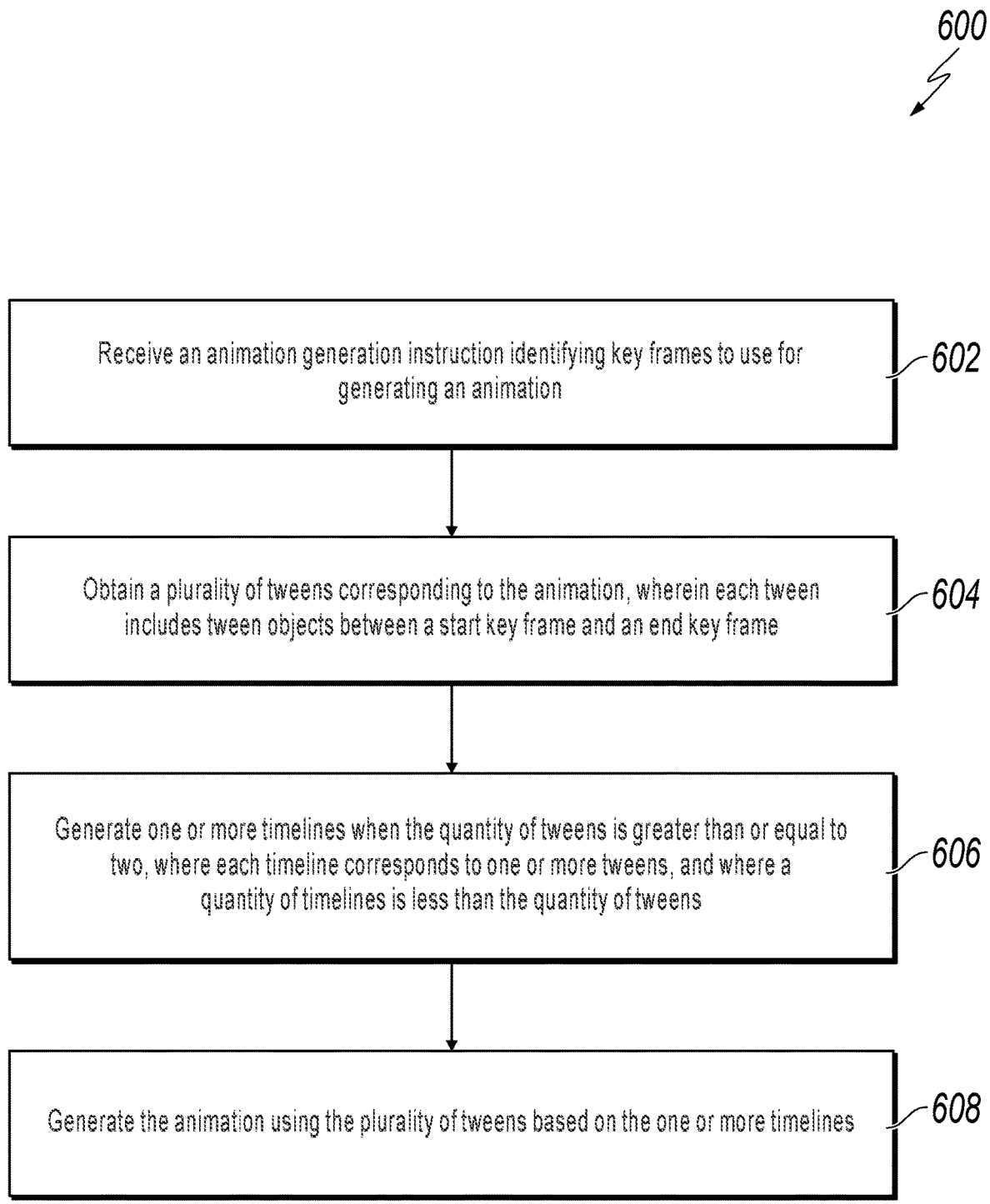
FIG. 6 is a flowchart illustrating an example of a computer-implemented method for generating an animation using tweens, according to an implementation of the present disclosure.

FIG. 6 is a flowchart illustrating an example of a computer-implemented method 600 for generating an animation using tweens, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, an animation generation instruction is received that identifies key frames to use for generating an animation. For example, the animation generation apparatus 400 can receive an instruction to generate an animation after several tweens have been defined, such as by a film editor, with some of the tweens potentially overlapping or being duplicative. From 602, method 600 proceeds to 604.

At 604, a plurality of tweens corresponding to the animation are obtained, where each tween includes tween objects between a start key frame and an end key frame. For example, the animation generation apparatus 400 can obtain tweens such as the tweens identified in Table 2. From 604, method 600 proceeds to 606.

At 606, when the quantity of tweens is greater than or equal to two, one or more timelines are generated, where each timeline corresponds to one or more tweens, and where a quantity of timelines is less than the quantity of tweens. As an example, the animation generation apparatus 400 can generate timelines using the tweens included in Table 2. Table 2, as shown, may only list some of the tweens that are to be used in the timeline. From 606, method 600 proceeds to 608.

At 608, the animation is generated using the plurality of tweens based on the one or more timelines. For example, the animation generation unit 403 can generate the animation using the tweens that exist.

In some implementations, generation of the animation can include handling conflicting tweens. For example, when a given timeline of the one or more timelines corresponds to a plurality of tweens, a determination can be made whether there is an M-level conflicting tween group in the plurality of tweens. The M-level conflicting tweens in the M-level conflicting tween group have the same tween object and conflicting tween time, such as having overlaps shown in Table 2. In this example, M is a natural number, and an initial value is a default count initial value. In another example, when there is an M-level conflicting tween group, the M-level conflicting tween that corresponds to the latest end time in the M-level conflicting tween group can be updated with an (M+1)-level conflicting tween. For example, updating the M-level conflicting tween (a group having M tweens, for example) that corresponds to the latest end time in the M-level conflicting tween group with an (M+1)-level conflicting tween comprises can include updating an M-level conflicting tween having the largest frame number of a tween end key frame in the M-level conflicting tween group with the (M+1)-level conflicting tween. Also, a determination can be made whether there is an (M+1)-level conflicting tween group in the (M+1)-level tween. This process can continue until there is no (M+K)-level conflicting tween group in an (M+K)-level conflicting tween, where K is a natural number greater than or equal to 0. In either example, an animation is generated for a corresponding non-conflicting tween and the (M+K)-level tween based on the timeline.

In some implementations, determining whether there is an M-level conflicting tween group in the plurality of tweens can include identifying conflicting times of tween objects in each tween. For example, a tween object of each tween is obtained. Then, when two or more tweens have the same tween object, a determination is made whether a tween time of any one of the two or more tweens conflicts with a tween time of another tween. If the tween time of the any tween conflicts with the tween time of the another tween, a determination is made that there is at least one M-level conflicting tween group in the plurality of tweens, where the M-level conflicting tween group comprises the any tween and the another tween. For example, tween groups having M tweens may overlap.

In some implementations, determining whether a tween time of any one of the two or more tweens conflicts with a tween time of another tween can include, for example, determining whether there is an intersection between a tween time between a start key frame and an end key frame of the any tween and a tween time between a start key frame and an end key frame of the another tween. If there is an intersection, then a determination can be made that the tween time of the any tween conflicts with the tween time of the another tween. For example, tween groups having overlapping tween times can be determined to be overlapping.

In some implementations, generating the animation can include using a single tween object from a plurality of tween objects having conflicting tween time. For example, the animation that is created can exclude redundant tween objects, so as to generate a seamless animation that include only one instance of the tween objects that are intended. After 608, method 600 stops.

The techniques described in the present disclosure can be used to process, for use in an animation, a group of tween, some of which may be overlapping. Timelines can be used as a tool, in a sense, for determining overlapping tweens. Timelines can overlap if tween objects (individual frames) are in common, based on the time. Successful animation is not to include all of the tweens. Rather, tweens can be up updated to omit portions that overlap so that an animation can be produced. By automatically resolving overlapping timelines of tweens and tween objects, an animation can be produced regardless of a number of times that a file editor has selected tweens for animating. In this way, the animation that is generated, regardless of the number of edits to tweens, can give the appearance that the first image evolves smoothly into the second image.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving an animation generation instruction identifying key frames to use for generating an animation;
obtaining a plurality of tweens corresponding to the animation, wherein each tween includes tween objects between a start key frame and an end key frame;
generating one or more timelines when a quantity of tweens is greater than or equal to two, wherein each timeline corresponds to one or more tweens, and wherein a quantity of timelines is less than the quantity of tweens; and
generating the animation using the plurality of tweens based on the one or more timelines, wherein generating the animation comprises:
when a given timeline of the one or more timelines corresponds to a plurality of tweens, determining whether there is an M-level conflicting tween group in the plurality of tweens, wherein M-level conflicting tweens in the M-level conflicting tween group have the same tween object and conflicting tween time based on an intersection between tween times between start key frames and end key frames of the conflicting tweens, M is a natural number, and an initial value is a default count initial value;
when there is the M-level conflicting tween group, updating an M-level conflicting tween that corresponds to the latest end time in the M-level conflicting tween group with an (M+1)-level conflicting tween, and determining whether there is an (M+1)-level conflicting tween group in the (M+1)-level tween, until there is no (M+K)-level conflicting tween group in an (M+K)-level conflicting tween, wherein K is a natural number greater than or equal to 0; and
generating an animation for a corresponding non-conflicting tween and the (M+K)-level tween based on the timeline.

2. The computer-implemented method of claim 1, wherein determining whether there is an M-level conflicting tween group in the plurality of tweens comprises:
obtaining a tween object of each tween; and
when two or more tweens have the same tween object, determining whether a tween time of any one of the two or more tweens conflicts with a tween time of another tween.

3. The computer-implemented method of claim 2, further comprising:
if the tween time of the any tween conflicts with the tween time of the another tween, determining that there is at least one M-level conflicting tween group in the plurality of tweens, wherein the M-level conflicting tween group comprises the any tween and the another tween.

4. The computer-implemented method of claim 3, wherein the determining whether a tween time of any one of the two or more tweens conflicts with a tween time of another tween comprises:
determining whether there is an intersection between a tween time between a start key frame and an end key frame of the any tween and a tween time between a start key frame and an end key frame of the another tween, and if there is an intersection, determining that the tween time of the any tween conflicts with the tween time of the another tween.

5. The computer-implemented method of claim 1, wherein updating the M-level conflicting tween that corresponds to the latest end time in the M-level conflicting tween group with an (M+1)-level conflicting tween comprises:
updating an M-level conflicting tween having the largest frame number of a tween end key frame in the M-level conflicting tween group with the (M+1)-level conflicting tween.

6. The computer-implemented method of claim 1, wherein generating the animation comprises:
using a single tween object from a plurality of tween objects having conflicting tween time.

7. A non-transitory, computer-readable medium storing one or more instructions executable by a computer system to perform operations comprising:
receiving an animation generation instruction identifying key frames to use for generating an animation;
obtaining a plurality of tweens corresponding to the animation, wherein each tween includes tween objects between a start key frame and an end key frame;
generating one or more timelines when a quantity of tweens is greater than or equal to two, wherein each timeline corresponds to one or more tweens, and wherein a quantity of timelines is less than the quantity of tweens; and
generating the animation using the plurality of tweens based on the one or more timelines, wherein generating the animation comprises:
when a given timeline of the one or more timelines corresponds to a plurality of tweens, determining whether there is an M-level conflicting tween group in the plurality of tweens, wherein M-level conflicting tweens in the M-level conflicting tween group have the same tween object and conflicting tween time based on an intersection between tween times between start key frames and end key frames of the conflicting tweens, M is a natural number, and an initial value is a default count initial value;
when there is the M-level conflicting tween group, updating an M-level conflicting tween that corresponds to the latest end time in the M-level conflicting tween group with an (M+1)-level conflicting tween, and determining whether there is an (M+1)-level conflicting tween group in the (M+1)-level tween, until there is no (M+K)-level conflicting tween group in an (M+K)-level conflicting tween, wherein K is a natural number greater than or equal to 0; and
generating an animation for a corresponding non-conflicting tween and the (M+K)-level tween based on the timeline.

8. The non-transitory, computer-readable medium of claim 7, wherein determining whether there is an M-level conflicting tween group in the plurality of tweens comprises:
obtaining a tween object of each tween; and
when two or more tweens have the same tween object, determining whether a tween time of any one of the two or more tweens conflicts with a tween time of another tween.

9. The non-transitory, computer-readable medium of claim 8, further comprising:
if the tween time of the any tween conflicts with the tween time of the another tween, determining that there is at least one M-level conflicting tween group in the plurality of tweens, wherein the M-level conflicting tween group comprises the any tween and the another tween.

10. The non-transitory, computer-readable medium of claim 9, wherein the determining whether a tween time of any one of the two or more tweens conflicts with a tween time of another tween comprises:
   determining whether there is an intersection between a tween time between a start key frame and an end key frame of the any tween and a tween time between a start key frame and an end key frame of the another tween, and if there is an intersection, determining that the tween time of the any tween conflicts with the tween time of the another tween.

11. The non-transitory, computer-readable medium of claim 7, wherein updating the M-level conflicting tween that corresponds to the latest end time in the M-level conflicting tween group with an (M+1)-level conflicting tween comprises:
   updating an M-level conflicting tween having the largest frame number of a tween end key frame in the M-level conflicting tween group with the (M+1)-level conflicting tween.

12. The non-transitory, computer-readable medium of claim 7, wherein generating the animation comprises:
   using a single tween object from a plurality of tween objects having conflicting tween time.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving an animation generation instruction identifying key frames to use for generating an animation;
      obtaining a plurality of tweens corresponding to the animation, wherein each tween includes tween objects between a start key frame and an end key frame;
      generating one or more timelines when a quantity of tweens is greater than or equal to two, wherein each timeline corresponds to one or more tweens, and wherein a quantity of timelines is less than the quantity of tweens; and
      generating the animation using the plurality of tweens based on the one or more timelines, wherein generating the animation comprises:
         when a given timeline of the one or more timelines corresponds to a plurality of tweens, determining whether there is an M-level conflicting tween group in the plurality of tweens, wherein M-level conflicting tweens in the M-level conflicting tween group have the same tween object and conflicting tween time based on an intersection between tween times between start key frames and end key frames of the conflicting tweens, M is a natural number, and an initial value is a default count initial value;
         when there is the M-level conflicting tween group, updating an M-level conflicting tween that corresponds to the latest end time in the M-level conflicting tween group with an (M+1)-level conflicting tween, and determining whether there is an (M+1)-level conflicting tween group in the (M+1)-level tween, until there is no (M+K)-level conflicting tween group in an (M+K)-level conflicting tween, wherein K is a natural number greater than or equal to 0; and
         generating an animation for a corresponding non-conflicting tween and the (M+K)-level tween based on the timeline.

14. The computer-implemented system of claim 13, wherein determining whether there is an M-level conflicting tween group in the plurality of tweens comprises:
   obtaining a tween object of each tween; and
   when two or more tweens have the same tween object, determining whether a tween time of any one of the two or more tweens conflicts with a tween time of another tween.

15. The computer-implemented system of claim 14, further comprising:
   if the tween time of the any tween conflicts with the tween time of the another tween, determining that there is at least one M-level conflicting tween group in the plurality of tweens, wherein the M-level conflicting tween group comprises the any tween and the another tween.

16. The computer-implemented system of claim 15, wherein the determining whether a tween time of any one of the two or more tweens conflicts with a tween time of another tween comprises:
   determining whether there is an intersection between a tween time between a start key frame and an end key frame of the any tween and a tween time between a start key frame and an end key frame of the another tween, and if there is an intersection, determining that the tween time of the any tween conflicts with the tween time of the another tween.

17. The computer-implemented system of claim 13, wherein generating the animation comprises:
   using a single tween object from a plurality of tween objects having conflicting tween time.

* * * * *